United States Patent
Brown

(10) Patent No.: US 8,857,325 B2
(45) Date of Patent: Oct. 14, 2014

(54) SYSTEM, METHOD AND APPARATUS FOR CUTTING FOODS

(76) Inventor: Jennie Kathryn Brown, Norfolk, CT (US)

(*) Notice: Subject to any disclaimer, the term of this patent is extended or adjusted under 35 U.S.C. 154(b) by 760 days.

(21) Appl. No.: 12/771,111

(22) Filed: Apr. 30, 2010

(65) Prior Publication Data

US 2010/0275792 A1  Nov. 4, 2010

Related U.S. Application Data

(60) Provisional application No. 61/175,150, filed on May 4, 2009.

(51) Int. Cl.
| | | |
|---|---|---|
| *B26B 3/04* | (2006.01) | |
| *A21C 15/04* | (2006.01) | |
| *B26D 3/18* | (2006.01) | |
| *B26D 5/10* | (2006.01) | |
| *B26D 7/00* | (2006.01) | |

(52) U.S. Cl.
  CPC . *B26D 3/185* (2013.01); *B26D 5/10* (2013.01); *A21C 15/04* (2013.01); *B26D 7/00* (2013.01)
  USPC ............... 99/537; 30/114; 30/303; 30/305; 30/315; 83/167

(58) Field of Classification Search
  USPC .......... 99/430, 537; 30/114, 303, 304, 305, 30/314; 83/932, 167
  See application file for complete search history.

(56) References Cited

U.S. PATENT DOCUMENTS

| | | | |
|---|---|---|---|
| 410,682 A | | 9/1889 | Berry |
| 1,110,946 A | * | 9/1914 | Lahiere ............................ 30/305 |
| 1,364,863 A | | 1/1921 | Buchtel |
| 1,453,367 A | * | 5/1923 | Schipplock et al. ............ 30/114 |
| 1,463,941 A | | 8/1923 | Cusimano |
| 1,746,521 A | | 7/1927 | Broeg |
| 1,853,140 A | | 4/1930 | Morrison |
| 1,867,657 A | | 7/1932 | Dellinger |
| 2,003,253 A | * | 5/1935 | Deutsch .......................... 30/114 |
| 2,089,396 A | | 4/1936 | Meilstrup |
| 2,254,759 A | | 9/1941 | Stainbrook |
| 2,618,852 A | | 8/1947 | Clough |
| 2,502,157 A | * | 3/1950 | Klejna ............................. 30/303 |
| 2,505,096 A | * | 4/1950 | Christopher .................... 30/303 |
| 2,557,539 A | * | 6/1951 | Henrickson ..................... 30/287 |
| 3,302,591 A | | 2/1967 | Schmidt |
| 3,349,824 A | | 10/1967 | Trenor |
| 3,363,589 A | | 1/1968 | Addington |
| 4,055,892 A | * | 11/1977 | Del Vecchio ................... 30/303 |
| 4,195,402 A | | 4/1980 | Leffer |
| 4,625,404 A | | 12/1986 | Valente et al. |
| 4,648,300 A | | 3/1987 | Hassenfelt, Jr. |
| D298,603 S | | 11/1988 | White |
| 4,967,477 A | | 11/1990 | Sanford |
| D356,718 S | | 3/1995 | Johannessen |

(Continued)

*Primary Examiner* — Reginald L Alexander
(74) *Attorney, Agent, or Firm* — Abel Law Group, LLP.

(57) ABSTRACT

A food cutter has a base and at least two transverse panels extending from the base and sized to complement a pan. The panels may form a grid with an upper end located in the base. The grid has a lower end with cutting edges adapted to cut food. The upper end may be concave and the lower end is flat. The base is formed from a smooth rigid material and may be covered in a soft pliable material. The grid may be coated with a food safe, non-stick material.

24 Claims, 12 Drawing Sheets

(56) References Cited

U.S. PATENT DOCUMENTS

| | | | |
|---|---|---|---|
| 5,579,582 A | 12/1996 | Carlson | |
| 5,848,470 A | 12/1998 | Anderson | |
| 6,009,786 A | 1/2000 | Hjelden | |
| 6,123,972 A * | 9/2000 | Matthews et al. | 426/518 |
| 6,276,918 B1 * | 8/2001 | Slaughter et al. | 425/289 |
| D586,626 S | 2/2009 | Carrell | |
| D590,215 S | 4/2009 | Carrell | |
| 7,870,820 B2 * | 1/2011 | Pivik | 99/430 |
| 8,146,469 B2 * | 4/2012 | Parr | 83/13 |
| 2004/0211069 A1 | 10/2004 | Tuttle | |
| 2004/0250667 A1 | 12/2004 | Atwater | |
| 2006/0272162 A1 | 12/2006 | Atwater et al. | |
| 2006/0272461 A1 | 12/2006 | Atwater et al. | |
| 2008/0209737 A1 | 9/2008 | Storms | |

\* cited by examiner

SYSTEM, METHOD AND APPARATUS FOR CUTTING FOODS

This application claims priority to and the benefit of U.S. Prov. App. No. 61/175,150, filed on May 4, 2009, and is incorporated herein by reference in its entirety.

BACKGROUND OF THE INVENTION

1. Field of the Disclosure

The present invention relates in general to kitchen equipment and, in particular, to a system, method and apparatus for cutting foods.

2. Description of the Related Art

Some baked goods are prepared as a homogenous entity of food in standard pans or containers such as baking pans and cookie sheets. The food is then typically sliced into smaller portions such as bars, squares or wedges for removal from the container. The task of slicing the food into desirable shapes is commonly performed by using a knife to make numerous cuts that define the sides of the portions. It can be difficult to slice such food into smaller portions with a knife while keeping the cuts uniform, straight and at an adequate depth of cut. There are many prior art cutting tools that use an array of cutting blades to cut food into smaller portions. Although these designs are workable for some applications, improvements in food cutting tools would be desirable.

SUMMARY

Embodiments of a system, method and apparatus for cutting food are disclosed. For example, a food cutting system may comprise a pan having a lower surface adapted to support food and a cutter and having a base and at least two transverse panels that define a grid extending from the base. A lower surface of the base may have a grid-like, rectilinear array of slots in which the upper end of the grid is mounted. The cutter may be sized to complement the pan. The grid has an upper end with edges that are mounted in the base. The grid also has a lower end with cutting edges for slicing food.

The upper end of the cutter may be concave in shape and have a planar lower end. Either the base or the panels may define a perimeter of the cutter. The base is formed from a smooth rigid material for supporting the grid. Surfaces of the base may be coated in a soft pliable material for user comfort, and the grid may be coated with a food safe, non-stick material. The cutting edges may be configured as straight, triangular points or serrated.

In other embodiments, the base has cylindrical handles in a parallel configuration on opposite ends of the cutter. The base may have tubular arcs extending between the handles, and the cutter may have indicia that define a shape of the cutting edges. The pan may comprise a frame and a false bottom that seats on a lip at the bottom of the frame. The pan also may have vertical walls that are complementary in shape to the panels of the grid.

In still other embodiments, both the cutter and the pan have pivotable handles that engage and interlock for leveraging the cutter into the food and pan. Each handle may be mounted on a hinge. Each cutter handle may comprise a bracket that is radially offset from a respective hinge, and each bracket has a radially offset grip relative to the hinge. Each pan handle may comprise a wire frame that is canted and terminates in an offset rectangular loop for engaging the cutter handle.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

DETAILED DESCRIPTION

Embodiments of a system, method and apparatus for cutting food are disclosed. For example, as depicted in FIGS. 1-7, a food cutter 31 may comprise a rectangular base 33 and a grid 35 protruding therefrom. The base 33 may be formed from a rigid but smooth material such as plastic (e.g., ABS) for facilitating handling of the grid 35. In some embodiments, surfaces of the base 33 are coated in a softer, more pliable material 37 (FIG. 7), such as silicone, rubber or other elastomeric materials, for comfort of the user. The pliable material 37 may be molded onto the base 33, formed by dipping, or still other manufacturing techniques.

Figure 1:
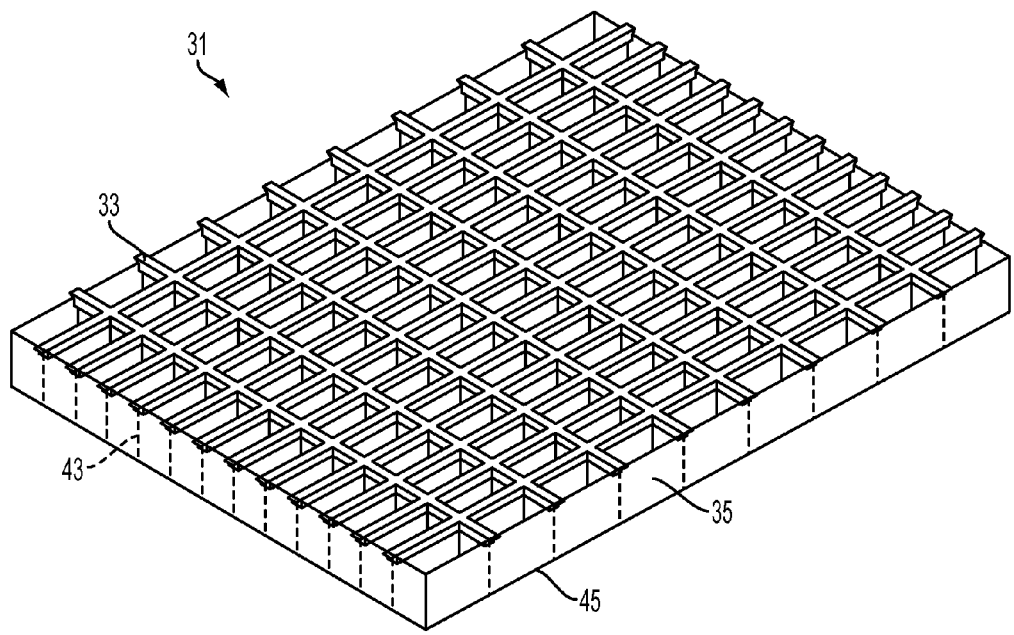
FIGS. 1-4 are isometric, front, side and top views of one embodiment of a cutter.
Figure 2:
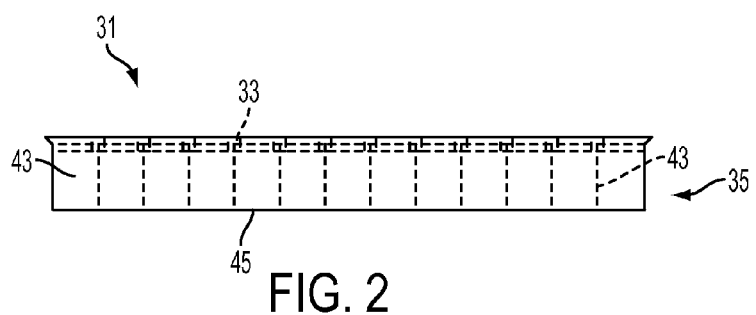
Figure 3:
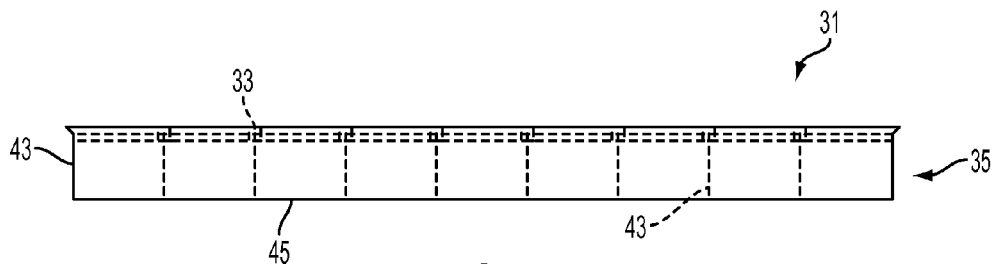
Figure 4:
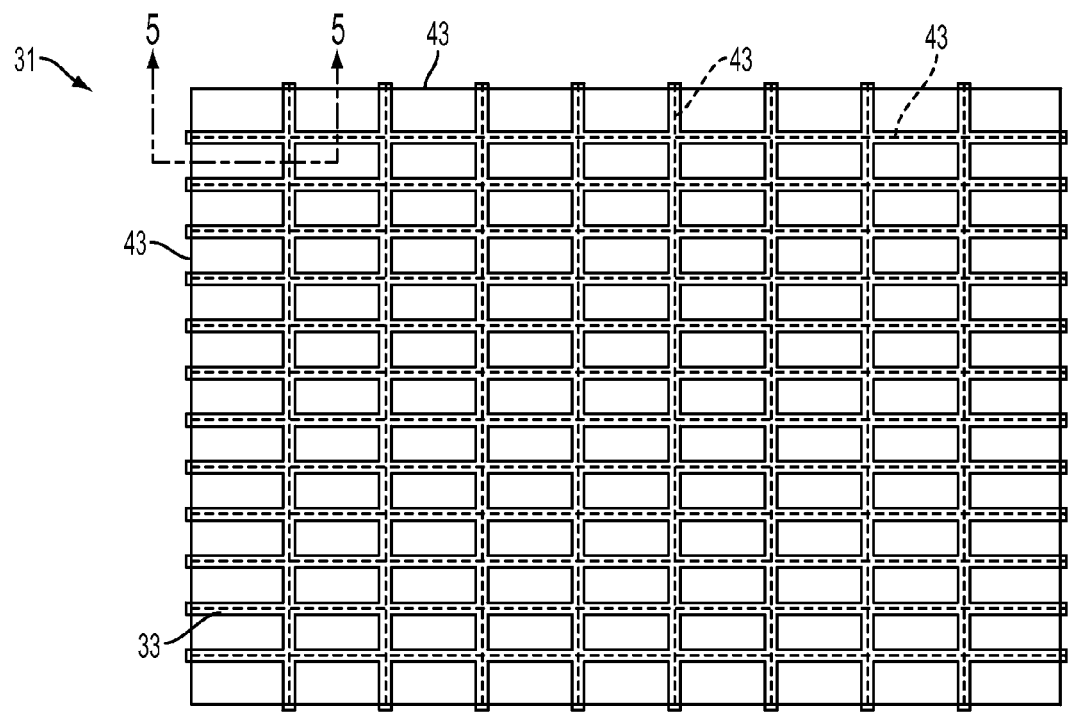
Figure 5:
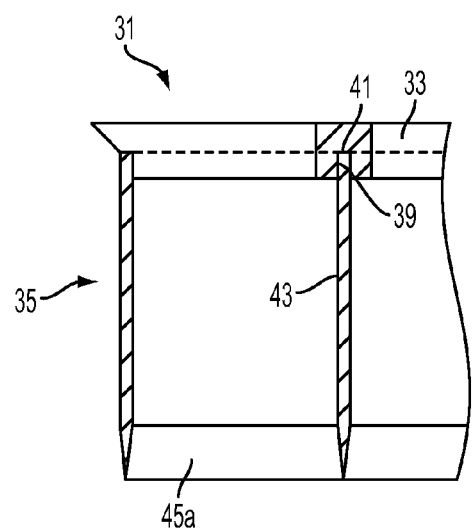
FIG. 5 is a sectional view of the cutter of FIG. 1, taken along the line 5-5 of FIG. 4.
Figure 6:
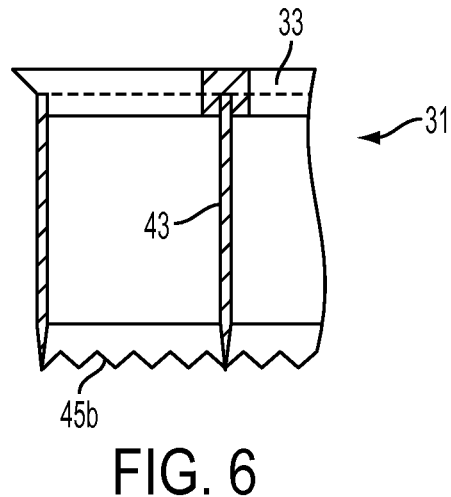
FIGS. 6 and 7 are sectional views of alternate embodiments of the cutter of FIG. 1, taken along the line 5-5 of FIG. 4.

As shown in FIG. 5, the lower surface of the base 33 is provided with a grid-like, rectilinear array of slots 39 in which the grid 35 is mounted. The upper ends or edges 41 of the grid 35 are inserted and installed in the slots 39, and may be permanently secured thereto via mechanical or adhesive means. In other embodiments, the base 33 may be molded directly onto the grid 35. Likewise, the pliable material 37 may be molded onto the base 33, formed by dipping, or still other manufacturing techniques.

Figure 7:
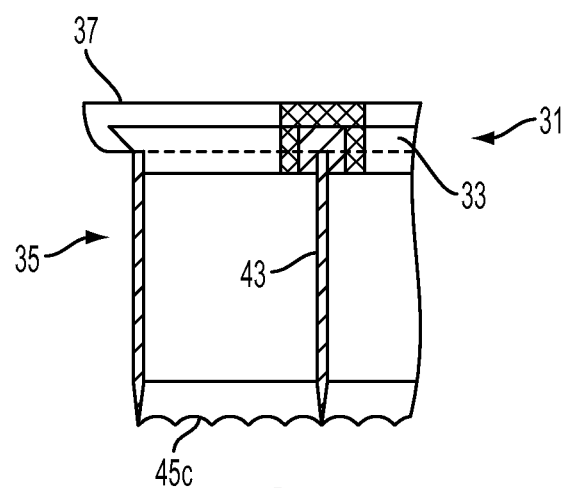

Embodiments of the grid 35 comprise an array of thin rigid strips or panels 43 that may be configured in a radial spoke or orthogonal pattern. Some patterns define a plurality of square or rectangular sections, as shown. The lower ends of the panels 43 have sharp edges 45 for cutting food. For example, the edges of the panels may be configured as straight 45a (FIG. 5), triangular points 45b (FIG. 6), or serrated 45c (FIG. 7). In the illustrated embodiment of FIG. 1, the perimeter of the cutter 31 is defined by four of the panels 43 to provide the cutter with a box-like shape beneath the outermost ends of the base 33.

Embodiments of the grid 35 may be manufactured from stainless steel, aluminum or other food safe materials that are rigid, durable and can repeatedly cut foods without readily dulling. The grid 35 may be coated in a food safe, non-stick material that allows the user to place it over food on a container or pan, such as a baking sheet or pan, press down and cut the food in a single action.

Embodiments of the grid comprise two or more food safe, flat metal strips that are approximately 3.5 inches tall by about 12 to 36 inches long. These dimensions vary based on the size of the cookie sheet or baking pan in which the grid is designed to fit. The strips used to form the grid may be manufactured in the form of an integral grid or as independent strips that are joined together to form the grid through mechanical means (e.g., food safe solder, clamps or screws). Again, the entire device, or only the grid, may be coated in a food safe, non-stick material.

The grid also may be formed through the use of a mold in which molten metal is poured and cured. The components work together to form the grid. When joined together, the metal strips form sections of the grid at specified intervals. The metal strips may be cut to desired lengths and attached based on the desired sizes of the food portions.

Figure 11:
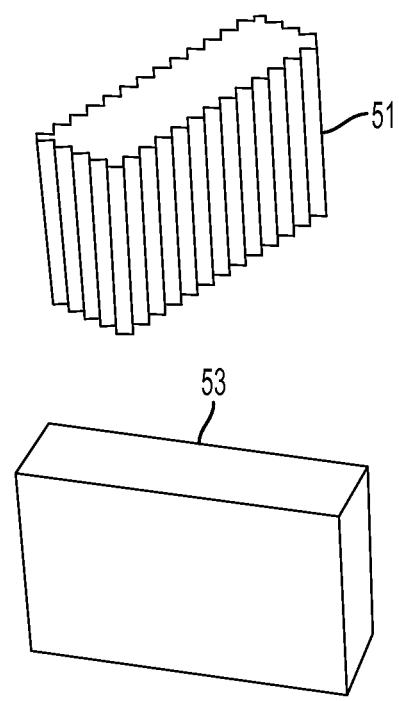
FIG. 11 depicts isometric views of bars formed by cutters disclosed herein.
Figure 12A:
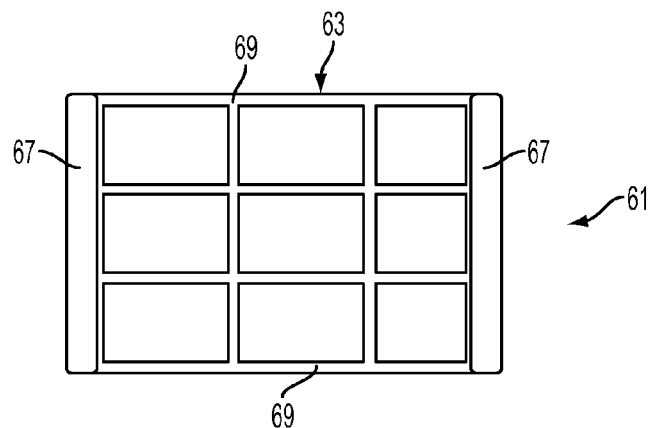
FIGS. 12A-E are top, front, bottom and side views of an alternate embodiment of a cutter.
Figure 12B:
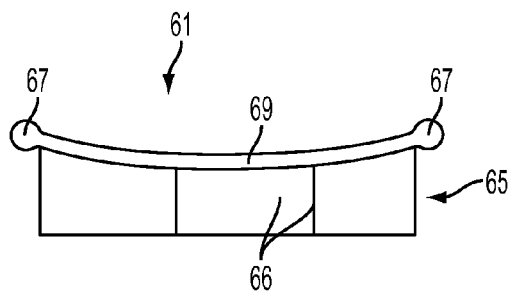
Figure 12C:
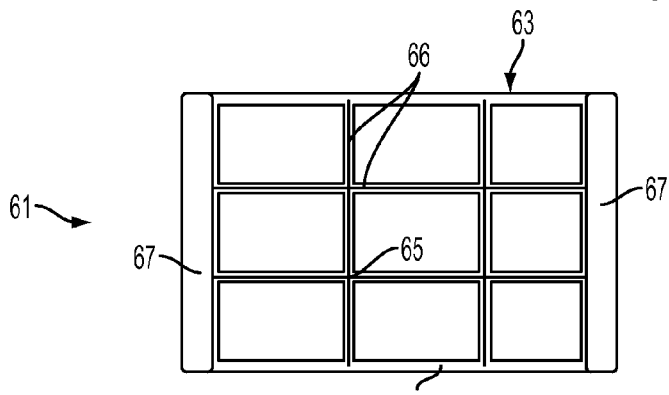
Figure 12D:
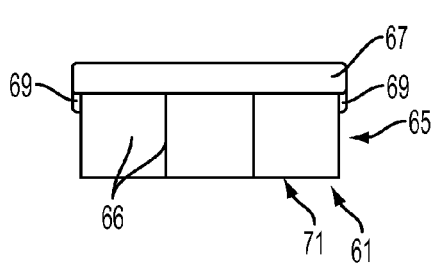
Figure 12E:
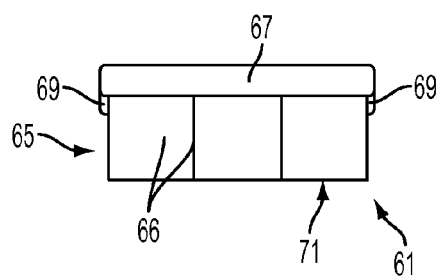

Some embodiments are well suited for applications such as cookie cutters for "bar" shaped cookies 51, 53 (FIG. 11). These designs allow users to cut bar-shaped cookies in a quick, easy and professional manner. The cutter provides uniformity in size and an enhanced appearance to the cookie bars. Either before or after baking the cookies, the user may place the cutter on the dough in the cookie sheet or baking pan and press the cutter down into it to cut and form the bars.

For example, some embodiments of a cutter employ baking pans having the following dimensions or sizes: 15×10×2, 13×9×2, and 8×8×2 inches. Cutters may be respectively deployed with such baking pans for providing grid patterns having the following exemplary dimensions for the portions of food they cut: 1×3 (e.g., toffee bars, etc.) for the largest pan; 3×4¾ (e.g., lasagna, casserole), 1½×1½ (e.g., petit four) and 1×2½ inches (e.g., larger bar cookies) for the intermediate pan; and 2×2 inches (e.g., brownies, lemon squares, etc.) for the smallest pan. These are only a few examples of suitable applications.

Figure 8:
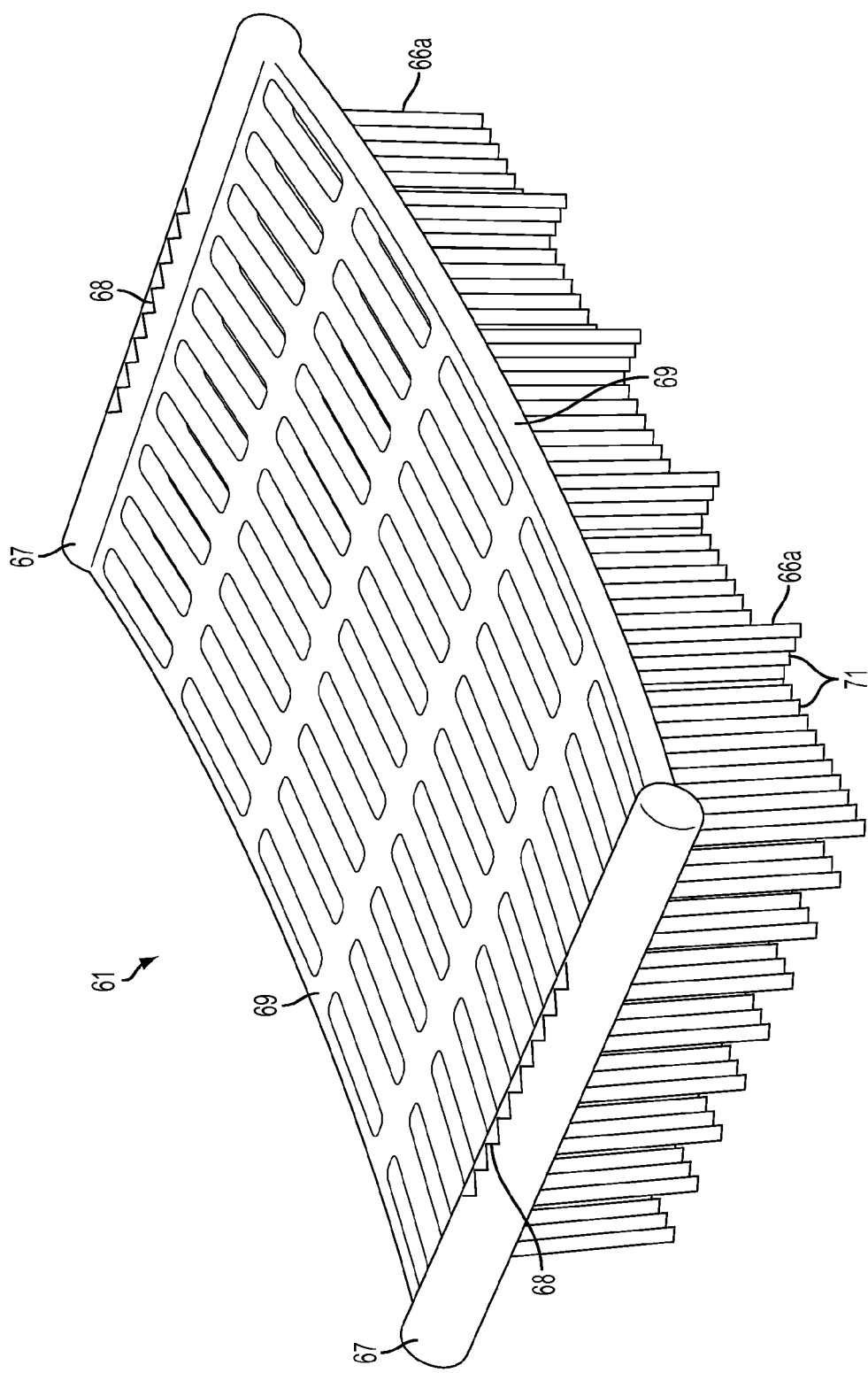
FIG. 8 is an isometric view of another embodiment of a cutter.

Referring now to FIGS. 8-10 and 12, other embodiments of a food cutting system are shown. For example, FIG. 8 depicts a cutter 61 comprising a base 63 and a grid 65 of panels 66 protruding therefrom. However, embodiments of the base 63 also have large cylindrical handles 67 in a parallel configuration on opposite longitudinal ends of the cutter 61 for improved leverage for the user.

Figure 10:
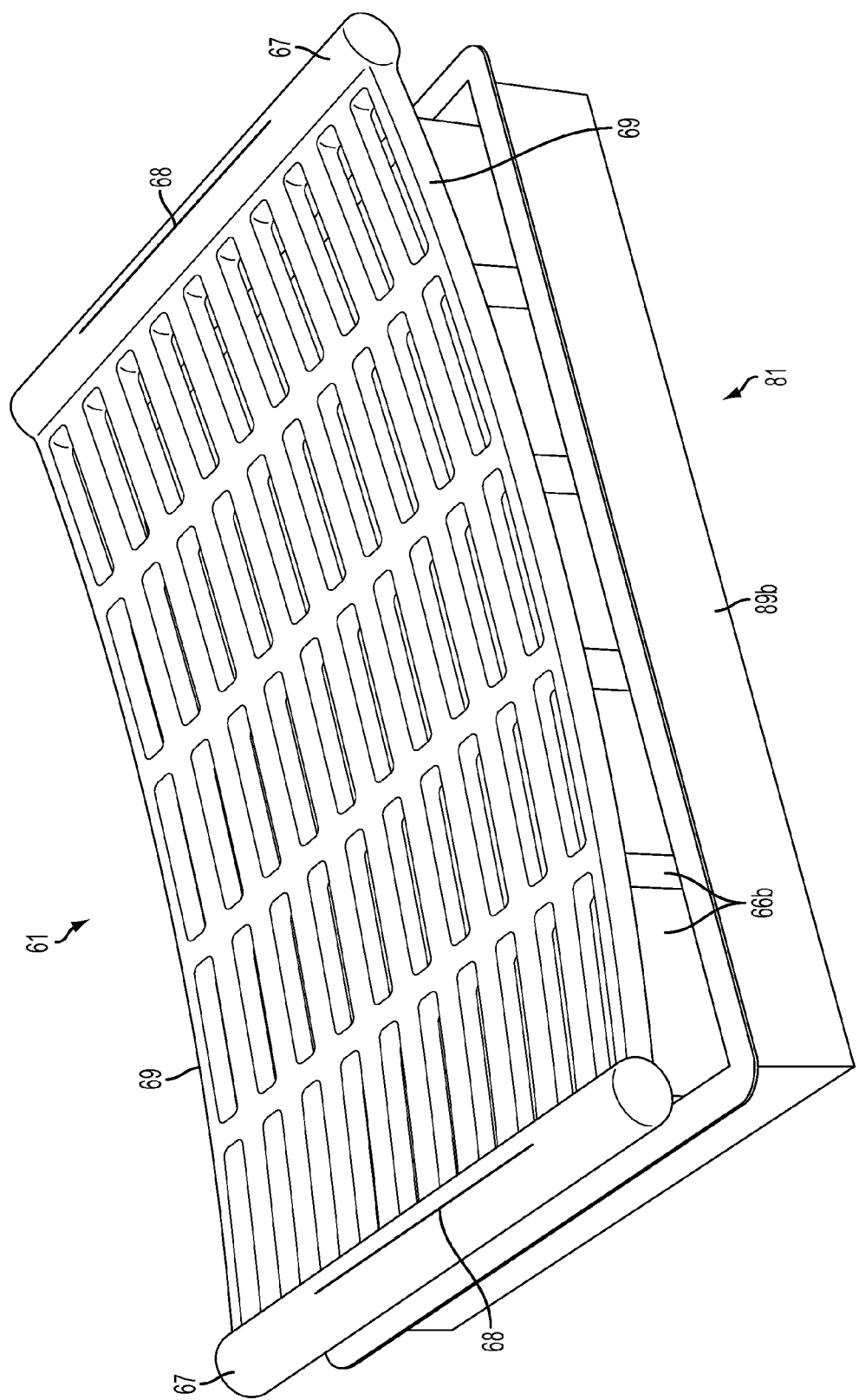
FIG. 10 is an isometric view of another embodiment of a cutter and baking pan in operation.

As shown in FIGS. 8 and 10, the tops of the handles 67 may be provided with indicia 68 that define the shapes of the panels 66 and cutting edges 71 of the grid 65 (e.g., corrugated panels 66a in FIG. 8, and straight panels 66b in FIG. 10). The bases also may be color-coded for this same purpose. Base 63 may further comprise cylindrical or tubular arcs 69 of an enlarged diameter extending between the handles 67 in a curved configuration to form a more substantial frame for grid 65 for improved leverage for the user. This configuration provides the top of cutter 61 with a concave shape (FIG. 12B) along its longitudinal dimension. The illustrated embodiment of FIG. 12 also has asymmetric spacing (best shown in FIGS. 12A and C) between the panels for forming portions having different sizes with a single cut.

In the illustrated embodiment of FIG. 8, the perimeter of the cutter 61 is defined by the base 63, rather than the panels 66 to provide the cutter with an orthogonal, multi-walled configuration beneath the base 63. The grid 65 may be secured to base 63 as described herein for other embodiments. In the illustrated embodiment, however, grid 65 has a flat or planar bottom at cutting edges 71, and a concave top or upper end for integration into base 63.

Figure 9:
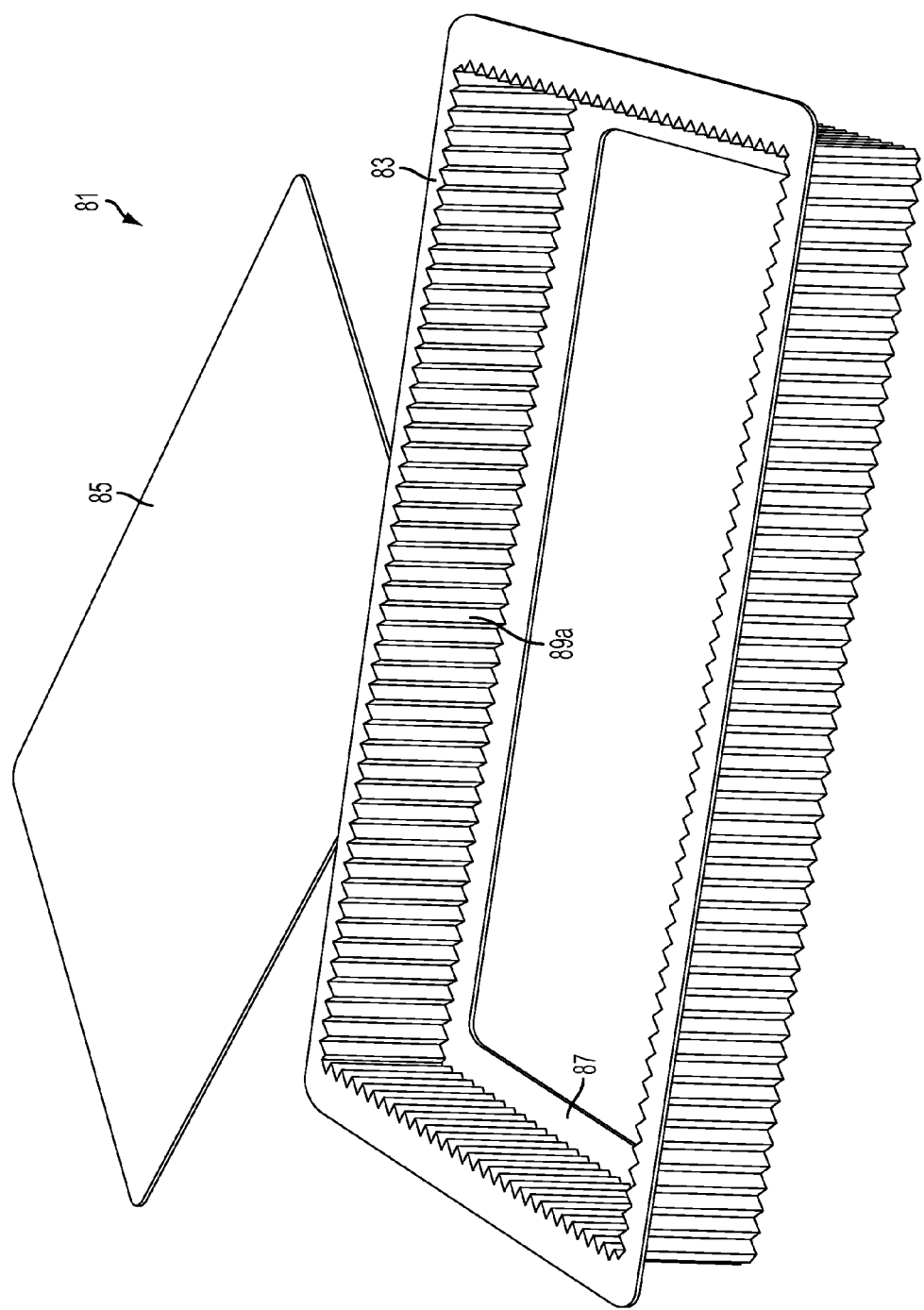
FIG. 9 is an isometric view of an embodiment of a baking pan having a false bottom.

The cutters described herein may be used in conjunction with cookie sheets, cake pans or baking pans, such as pan 81 depicted in FIGS. 9 and 10. Pan 81 comprises a frame 83 and a false bottom 85 that seats on a lip 87 on the bottom of frame 83. Pan 81 may be provided with corrugated vertical walls 89a (FIG. 9) or smooth vertical walls 89b (FIG. 10) to match the patterns of their respective panels 66a, 66b on the grids on the cutters. As shown in FIG. 10, embodiments of cutters 61 have a larger vertical height than the pan 81 has depth, such that base 63 is designed to avoid contact with the food in pan 81 during use.

Figure 13:
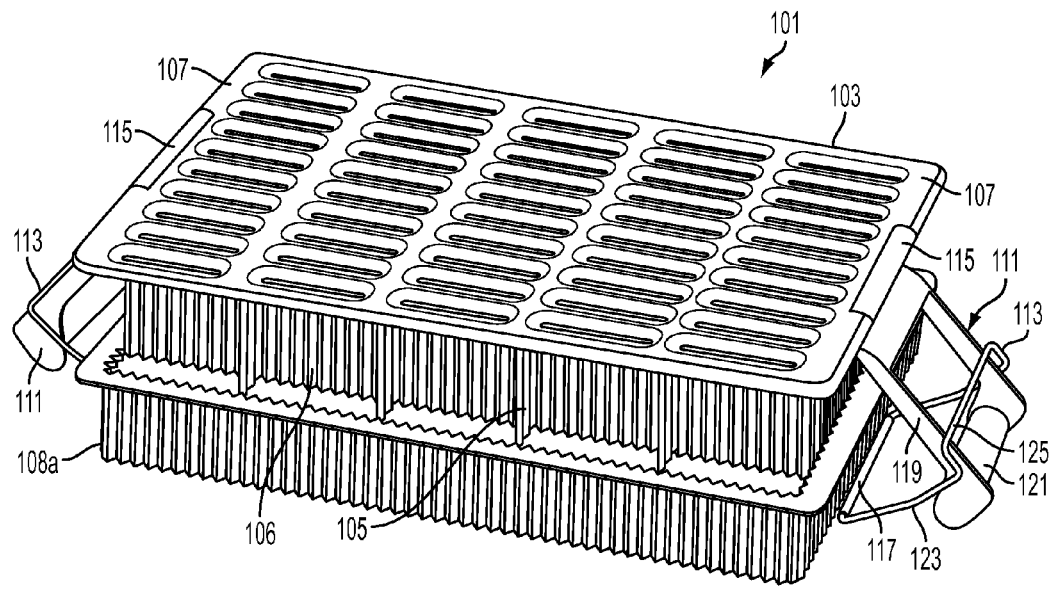
FIG. 13 is an isometric view of still another embodiment of a cutter and baking pan prior to deployment.
Figure 14:
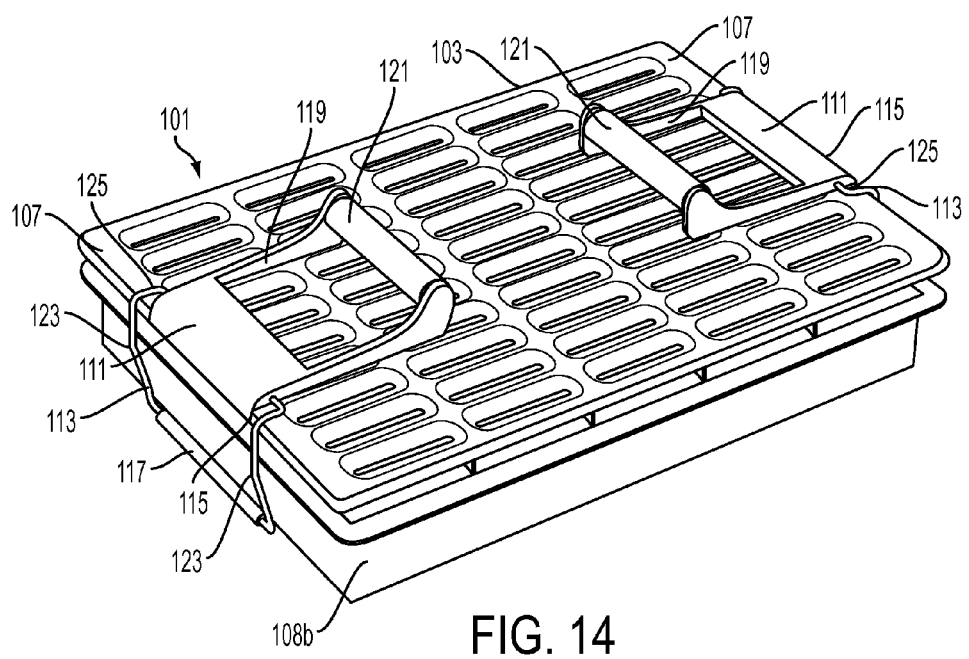
FIG. 14 is an isometric view of yet another embodiment of a cutter and baking pan fully deployed.
Figure 15A:
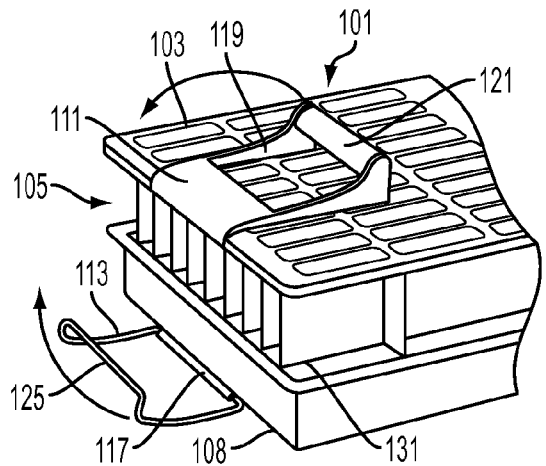
FIGS. 15A-C are sequential isometric views of an embodiment of the cutter and baking pan of FIGS. 13 and 14 in operation.

FIGS. 13-15 depict embodiments of a food cutting system having a cutter 101 comprising a base 103 and a grid 105 of panels 106 protruding therefrom. Cutter 101 is a hybrid of the previous embodiments, in that it has a flat top and bottom, but with enlarged end frames 107 for better support. Both cutter 101 and its pan 108 may be configured as any of the embodiments described herein, with additional features.

For example, both cutter 101 and pan 108 are provided with handles 111, 113, respectively, at each longitudinal end. Handles 111 are pivotally mounted to the upper end of cutter 101 at hinges 115 on end frames 107. Handles 113 are pivotally mounted to the lower ends of pan 108 at hinges 117. Each cutter handle 111 further comprises a bracket 119 that is radially offset from hinge 115. Brackets 119 extend substantially linearly, but terminate in a radially offset grip 121 that protrudes in the same direction relative to hinge 115. Each pan handle 113 comprises a wire frame that is canted at a large obtuse angle near a midpoint 123, and terminates in an offset rectangular loop 125 that extends even further in the same direction as the cant.

In operation (FIG. 15), pan 108 contains food and cutter 101 is aligned and placed in the pan (FIG. 15A), such that the cutting edges 131 of the grid 105 are located in the pan 108 on the top surface of the food. Pan handles 113 extend from the lower longitudinal ends of pan 108 and rest on the underlying surface that supports pan 108. Cutter handles 111 initially rest on top of base 103, but are rotated outward and away from cutter 101 until grips 121 rest on the underlying surface. Cutter handles 111 are narrower in lateral width than pan handles 113, such that they locate within the respective wire frames of pan handles 113.

Figure 15B:
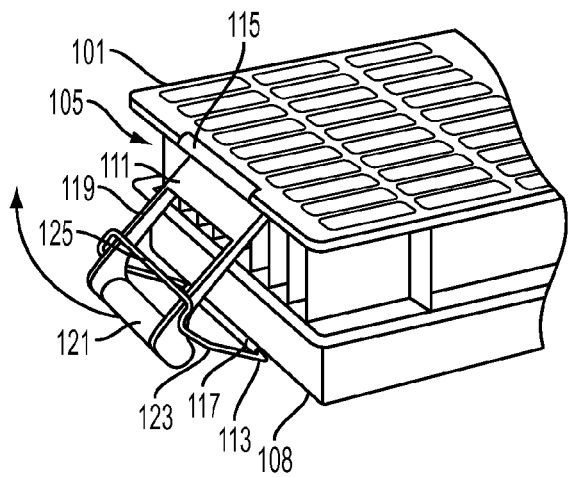
Figure 15C:
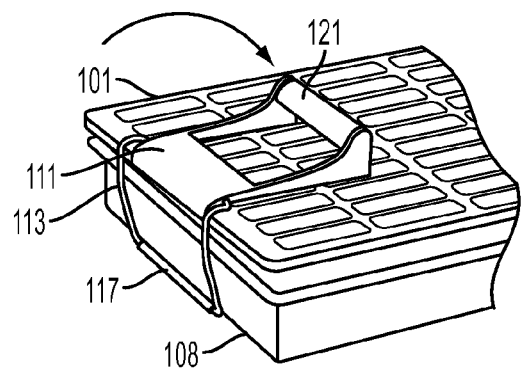

As shown in FIG. 15B, the pan handles 113 are then lifted slightly until their rectangular loops 125 come to rest on top of the brackets 119 of cutter handles 111. The user then pulls grips 121 outward and upward to rotate cutter handles 111 against the rectangular loops 125. This causes a leverage action by cutter handles 111 as the rectangular loops 125 slide inward along the upper edges of brackets 119. Continued rotation of cutter handles 111 (FIG. 15C) causes the grid 105 to steadily cut into the food in the pan 108 and slice the food in a very controlled and precise manner. The cutter 101 is then removed from the assembly by reversing these steps so that the sliced food may be removed from pan 108.

Figure 16:
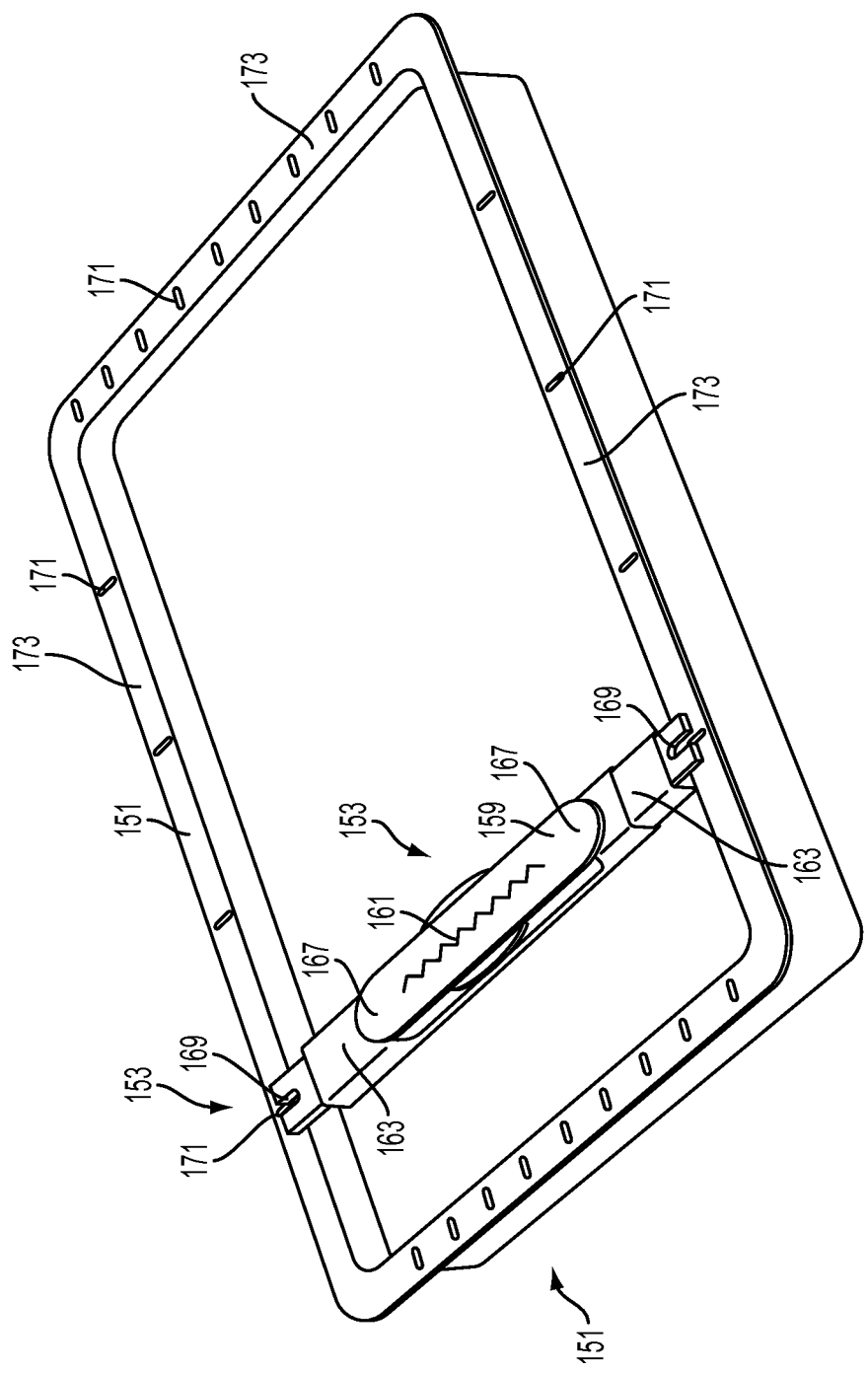
FIG. 16 is an isometric view of another embodiment of a cutter and baking pan.
Figure 17:
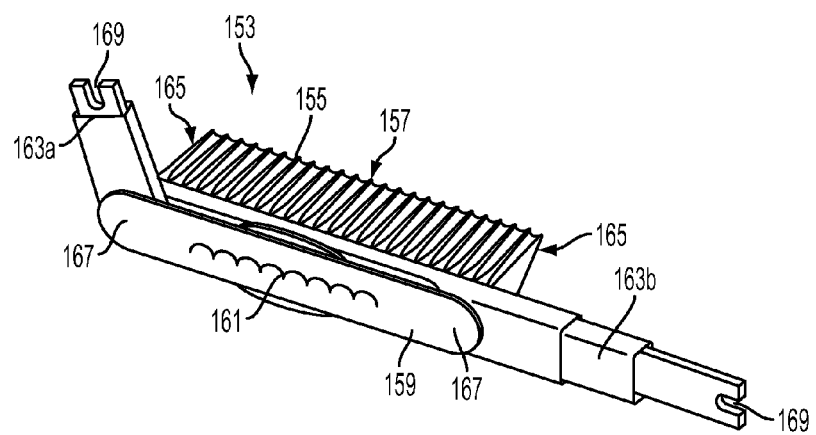
FIG. 17 is an isometric view of the cutter of FIG. 16 in an alternate configuration.

FIGS. 16 and 17 illustrate embodiments of a food cutting system comprising a pan 151 and a cutter 153. Unlike previous embodiments, cutter 153 does not employ a grid of panels; rather, it only has a single stiff panel 155 (FIG. 17) with a cutting edge 157. Cutter 153 has a base or handle 159 for rigidly supporting the panel 155. Handle 159 may be provided with indicia 161 that depicts the shape of panel 155 and cutting edge 157, as previously described herein for other embodiments.

From handle 159 extends two pivotable and retractable (e.g., telescopic) arms 163. In FIG. 17, arm 163a is shown in a retracted and pivoted position, while arm 163b is shown in an extended and aligned position. The pivots 167 between handle 159 and arms 163 are axially aligned with the lateral ends 165 of panel 155. In addition, cutter 153 is provided with alignment grooves 169 that may be located on the ends of arms 163. Grooves 169 are provided for aligning cutter 153 with various reference marks 171 (FIG. 16) located on the upper flange 173 of pan 151.

The devices with the dimensions described elsewhere herein also may be provided for this latter guide and blade embodiment. Such designs also may incorporate a loaf pan application for foods such as banana bread, cranberry bread, etc. A standard loaf pan is 9×5×3 inches, and the cutting guide slots may be positioned at, for example, one-half inch intervals along the sides of the pan.

In still other embodiments, a food cutting system comprises a pan having a lower surface adapted to support food. A cutter is unattached to the pan and has a base and at least two transverse panels that define a grid extending from the base and sized to complement the pan. The grid has an upper end with edges, most or all of which are located in the base. The grid has a lower end with cutting edges adapted to cut food. The upper end may be concave in a longitudinal direction with the lower end flat. The panels may define a perimeter of the cutter, with the panels being orthogonal to each other. Alternatively, the base defines a perimeter of the cutter.

The base is formed from a smooth rigid material. Surfaces of the base may be covered or coated with a soft pliable material, and the grid may be coated with a food safe, non-stick material. A lower surface of the base may have a grid-like, rectilinear array of slots in which the upper end of the grid is mounted. The cutting edges may be configured as straight, triangular points, serrated, etc.

In other embodiments, the base has cylindrical handles in a parallel configuration on opposite longitudinal ends of the cutter. The base may have tubular arcs extending between the cylindrical handles in a curved configuration, and the cutter may have indicia that define a shape of the panels and/or cutting edges. The pan may comprise a frame and a false bottom that seats on a lip on a bottom of the frame, with the false bottom being adapted to support the food on the lower surface of the pan. The pan may have vertical walls that are complementary in shape to the panels of the grid.

In still other embodiments, both the cutter and the pan have handles that are pivotable at each longitudinal end thereof for engaging each other and adapted to provide leverage between the cutter and the pan for forcing the panels into the food. Each handle may be pivotally mounted on a hinge to a respective longitudinal end, with the hinges of the cutter located an upper ends thereof, and the hinges of the pan located on lower ends thereof. Each cutter handle may comprise a bracket that is radially offset from a respective hinge, and each bracket has a radially offset grip relative to the hinge. Each pan handle may comprise a wire frame that is canted at a large obtuse angle near a midpoint thereof, and terminates in an offset rectangular loop that extends even further in a same direction as the cant.

Some embodiments of a food cutting system comprise a pan having a lower surface adapted to support food. A cutter is unattached to the pan and has a base and a panel extending from the base. The panel has an upper end located in the base and a lower end with a cutting edge adapted to cut food. The base comprises a handle and two arms that are pivotable. The arms may be telescopic, such that they are extendable and retractable relative to the handle. The base may have indicia that depicts a shape of the panel and cutting edge. The handle may have pivots for the arms that are axially aligned with lateral ends of the panel. The cutter may have alignment grooves for aligning the cutter with reference marks located on the pan, with the alignment grooves located on lateral ends of the arms.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A food cutting system, comprising:
   a pan having a surface adapted to support food; and
   a cutter having a base and at least two transverse panels that define a grid extending from the base and sized to complement the pan, the grid having an upper end with edges, with at least most of the edges being located in the base, and the grid having a lower end with cutting edges adapted to cut food; and
   both the cutter and the pan engage each other and are adapted to provide leverage between the cutter and the pan for forcing the panels into the food.

2. A system according to claim 1, wherein the upper end is concave in a longitudinal direction, and the lower end is flat.

3. A system according to claim 1, wherein the base defines a perimeter of the cutter, the base is formed from a smooth rigid material, and at least some of the base is covered in a soft pliable material.

4. A system according to claim 1, wherein the cutting edges are configured as triangular points or serrated.

5. A system according to claim 1, wherein the base has cylindrical handles in a parallel configuration on opposite longitudinal ends of the cutter, and the base has tubular arcs extending between the cylindrical handles in a curved configuration.

6. A system according to claim 1, wherein the cutter and the pan each comprise a handle that is pivotally mounted on a hinge to a respective longitudinal end, with the hinges of the cutter located an upper ends thereof, and the hinges of the pan located on lower ends thereof.

7. A system according to claim 1, wherein the cutter comprises a cutter handle having a bracket that is radially offset from a respective hinge thereof, and each bracket has a radially offset grip relative to the hinge.

8. A system according to claim 1, wherein the pan comprises a pan handle having a wire frame that is canted at a large obtuse angle near a midpoint thereof, and terminates in an offset rectangular loop that extends even further in a same direction as the cant.

9. A system according to claim 1, further comprising indicia on the base that defines a shape of the cutting edges.

10. A system according to claim 1, further comprising a food safe, non-stick coating on the grid.

11. A system according to claim 1, wherein the handles are pivotable at respective longitudinal ends of the pan and cutter.

12. A food cutter, comprising:
    a cutter having a base formed from a smooth rigid material, the base having a lower surface comprising slots, a plurality of transverse panels that define a grid extending from the base beneath the slots of the base, the grid having an upper end with edges that are mounted in the slots, the upper end is concave in a longitudinal direction, the grid has a lower end with cutting edges adapted to cut food, and the lower end is flat.

13. A food cutter according to claim 12, wherein the base defines a perimeter of the cutter, and surfaces of the base are coated in a soft pliable material.

14. A food cutter according to claim 12, wherein the cutting edges are configured as triangular points or serrated, and the array of slots in the base comprises a rectilinear array of slots.

15. A food cutter according to claim 12, wherein the base has cylindrical handles in a parallel configuration on opposite longitudinal ends of the cutter, and the base has tubular arcs extending between the cylindrical handles in a curved configuration.

16. A food cutter according to claim 12, wherein the cutter has handles that are pivotable at each longitudinal end thereof and adapted to provide leverage between the cutter and a pan for forcing the panels into food located in the pan, and each handle is pivotally mounted on a hinge, with the hinges located at upper ends of the base.

17. A food cutter according to claim 16, wherein each cutter handle comprises a bracket that is radially offset from a respective hinge, and each bracket has a radially offset grip relative to the hinge.

18. A food cutter according to claim 12, wherein the base has handles, and further comprising indicia on the handles of the base that defines a shape of the cutting edges.

19. A food cutter according to claim 12, further comprising a food safe, non-stick coating on the grid, and the grid has openings that are asymmetric.

20. A food cutting system, comprising:
    a pan having a surface adapted to support food; and
    a cutter having a base and a single panel extending from the base, the panel having an upper end located in the base and a lower end with a cutting edge adapted to cut food, the base comprising a handle and two arms that are pivotable relative to the handle.

21. A system according to claim 20, wherein the arms are telescopic, such that they are extendable and retractable relative to the handle.

22. A system according to claim 20, wherein the base has indicia that depicts a shape of the panel and cutting edge.

23. A system according to claim 20, wherein the handle has pivots for the arms and the pivots are axially aligned with lateral ends of the panel.

24. A system according to claim 20, wherein the cutter has alignment grooves for aligning the cutter with reference marks located on the pan, and the alignment grooves are located on lateral ends of the arms.

* * * * *

UNITED STATES PATENT AND TRADEMARK OFFICE
CERTIFICATE OF CORRECTION

| | | |
|---|---|---|
| PATENT NO. | : 8,857,325 B2 | Page 1 of 1 |
| APPLICATION NO. | : 12/771111 | |
| DATED | : October 14, 2014 | |
| INVENTOR(S) | : Brown | |

It is certified that error appears in the above-identified patent and that said Letters Patent is hereby corrected as shown below:

In the specification

Column 7, Line 40, claim 6, please delete "located an upper ends" and insert --located on upper ends--

Signed and Sealed this
Thirteenth Day of October, 2015

Michelle K. Lee
*Director of the United States Patent and Trademark Office*